Patented Nov. 17, 1953

2,659,722

UNITED STATES PATENT OFFICE 2,659,722

PENICILLIN SALTS OF AMINOALKYL-HYDROXYBENZOATES

Ole Hans Tobiassen, Copenhagen, Denmark, assignor to Lovens kemiske Fabrik ved A. Kongsted, Copenhagen, Denmark, a firm No Drawing. Application April 1, 1950, Serial No. 153,493

Claims priority, application Denmark April 9, 1949

3 Claims. (Cl. 260—239.1)

This invention relates to the production of penicillin salts having a protracted effect.

The injection of solutions of the easily soluble penicillin salts, such as the sodium salt, results in a relatively high concentration of penicillin in the blood which, however, can only be maintained for a short time so that the injection has to be repeated at short intervals in order to keep up the concentration.

To avoid this drawback, it has been proposed to suspend the sodium salt of penicillin in a mixture of oil and wax, or even better to use the procaine salt of penicillin.

By injecting penicillin in the form of procaine penicillin in oil or water it is possible to reduce substantially the number of injections, sometimes even down to a single injection per 24 hours. The concentration of penicillin in the blood hereby attainable is, however, rather low, but in many cases sufficient to get a curative effect. In other cases, it is necessary to maintain higher concentrations of penicillin in the blood than those attainable by means of procaine penicillin alone, and in such cases it has been proposed to use mixtures of procaine penicillin with a soluble salt of penicillin. Directly after the injection there is thus attained a transitory high penicillin concentration due to the soluble salt and later a low concentration due to the procaine salt. In this case the effect of the penicillin, therefore, will not be as extensive as desirable.

It is an object of the present invention to produce a salt of penicillin with an organic base, which salt on injection produces a higher concentration of penicillin in the blood than in the case of procaine penicillin and which shows at the same time a decidedly protracted effect. More particularly, the object is to produce a salt of pencillin with a dialkylaminoalkyl-p-hydroxybenzoate, where the alkyl groups are alike or different and comprise a low number of carbon atoms, for example 1-4 carbon atoms, particularly diethylaminoethyl-p-hydroxybenzoate. These salts are only slightly soluble in water and in various organic solvents and they may, therefore, advantageously be used for concentration and purification of penicillin from impure solutions.

The present invention, therefore, relates primarily to a method for the production of a penicillin salt with protracted effect, in which penicillin or a salt of penicillin is reacted with a dialkylaminoalkyl-p-hydroxybenzoate or a salt thereof under such conditions that the salt of penicillin with the said base is precipitated on account of its slight solubility.

It appears that this method is particularly applicable to benzylpenicillin and the base should preferably be diethylaminoethyl-p-hydroxybenzoate. However, the alkyl group linked with the carbon ring may also be propyl or butyl.

According to the invention a solution of a soluble salt of dialkylaminoalkyl-p-hydroxybenzoate, especially diethylaminoethyl-p-hydroxybenzoate, such as the hydrochloride or the sulphate, may be added to a pure or impure aqueous solution of a penicillin salt whereby the salt of penicillin with the base in question precipitates in crystalline form and may be removed by filtration. To the solution (pure or impure) of penicillin itself in an organic solvent or a mixture of two or more organic solvents, however, there may also be added a solution of dialkylaminoalkyl-p-hydroxybenzoate, especially diethylaminoethyl-p-hydroxybenzoate, also in an organic solvent, whereby the salt crystallizes in a purified condition. Suitable organic solvents are for example ether, methyl-isobutyl ketone, amyl acetate or a mixture of these with acetone, ethanol or other alcohols.

The invention also comprises the products obtained by the methods described and at the same time the invention comprises generally a penicillin salt with a protracted effect provided that it is a salt of penicillin, especially benzyl penicillin, with a dialkylaminoalkyl-p-hydroxybenzoate, especially diethylaminoethyl-p-hydroxybenzoate.

The pure salt of benzyl penicillin with diethylaminoethyl-p-hydroxybenzoate is a stable crystalline substance which from aqueous solutions is crystallizing with one molecule water of crystallization. The melting point is 89–90° C. Its potency is 1000 units per mg. polarimetrically determined as based on a potency of 1667 units per mg. in the pure sodium salt of benzyl penicillin. The solubility in water at 25° C. is 14.5 parts by weight per 1000 parts by weight of water.

In the following the invention will be illustrated by a number of examples which, however, must not be considered as limitative to the invention, as various modifications will be obvious to those skilled in the art.

Example 1

To a solution of 7.5 g. of the sodium salt of penicillin, containing 1660 units per mg., in 75 ml. of water at a temperature of 5° C. is added a solution of 6.0 g. of diethylaminoethyl-p-hydroxybenzoate hydrochloride in 60 ml. of water. The salt crystallizes in fine needles. After 2 hours standing the precipitated crystals are filtered from the solution and washed twice with 25 ml. of water. The salt is then dried in an exsiccator over sulphuric acid. The yield is 10 g. of the salt of penicillin with diethylaminoethyl-p-hydroxybenzoate in a potency of 1000 units per mg.

*Example 2*

5 g. of potassium salt of penicillin with a potency of 540 units per mg. are dissolved in 30 ml. of water. To this solution is added a solution of 1.4 g. of diethylaminoethyl-p-hydroxybenzoate hydrochloride in 15 ml. of water at the sime time cooling in ice water. The crystallization is started by inocculation and rubbing, and after 2 hours standing the precipitated salt is removed by filtration and washed twice, each time with 10 ml. of water. After drying the salt weighs 2.20 g. and has a potency of 890 units per mg.

*Example 3*

30 ml. of acetone are added to 100 ml. of a solution in ether of pure penicillin containing 80,000 units per ml. To the mixture a solution of 3.5 g. of diethylaminoethyl-p-hydroxybenzoate in 20 ml. of ether is added while cooling. Hereby crystals of a salt of penicillin with diethylaminoethyl-p-hydroxybenzoate is precipitated, and when the crystallization is completed the salt is filtered off and washed twice, each time with 20 ml. of a mixture of acetone and ether. After drying the salt weighs 6.8 g. and has a potency of 1000 units per mg.

*Example 4*

40 ml. of anhydrous ethanol and a solution of 15 g. diethylaminoethyl-p-hydroxybenzoate in 100 ml. of amyl acetate are added to 200 ml. of a solution of penicillin in amyl acetate. The penicillin has a potency of 600 units per mg. and the solution contains 115,000 units per ml. When standing for 4 hours and stirring and cooling the salt crystallizes. After filtration and washing with a mixture of ethanol and amyl acetate the precipitated crystals are dried. The yield is 21.5 g. of a salt with the potency of 930 units per mg.

I claim:

1. A stable salt of penicillin with a dialkylaminalkyl-p-hydroxybenzoate with alkyl groups of one to four carbon atoms, said salt being only slightly soluble in water and, on injection, producing a high transitory penicillin blood concentration and a prolonged penicillin action, said high transitory penicillin blood concentration being higher than that produced on injection of procaine penicillin.

2. A stable crystalline salt of benzyl penicillin with diethylaminoethyl-p-hydroxybenzoate, said salt crystallizing from its aqueous solution with one molecule of water of crystallization, and melting at about 89–90° C., its solubility in water at 25° C. being about 1.45%, its potency being about 1,000 units per mg., said potency being determined polarimetrically, said salt, on injection, producing a high transitory penicillin blood concentration and a prolonged penicillin action, said high transitory penicillin blood concentration being higher than that produced on injection of procaine penicillin.

3. Penicillin salt of diethylaminoethyl-para hydroxybenzoate.

OLE HANS TOBIASSEN.

References Cited in the file of this patent

UNITED STATES PATENTS

| Number | Name | Date |
|---|---|---|
| 2,243,694 | Christiansen et al. | May 27, 1941 |
| 2,483,382 | Goldberg et al. | Sept. 27, 1949 |
| 2,493,625 | Goldberg et al. | Jan. 3, 1950 |
| 2,515,898 | Rhodehamel | July 18, 1950 |

OTHER REFERENCES

Ballaro: "Ciencia e Investigacion," vol. 4, November 1948, pp. 481 and 482.